United States Patent [19]
Torii et al.

[11] Patent Number: 5,233,202
[45] Date of Patent: Aug. 3, 1993

[54] METHOD OF ADJUSTING AN OPTICAL PATH FOLLOWED BY A LASER BEAM IN A LASER ROBOT AND AN APPARATUS FOR CARRYING OUT THE SAME

[75] Inventors: Nobutoshi Torii, Hachioji; Akihiro Terada, Yamanashi, both of Japan

[73] Assignee: Fanuc Ltd., Yamanashi, Japan

[21] Appl. No.: 867,107

[22] PCT Filed: Nov. 12, 1991

[86] PCT No.: PCT/JP91/01546
§ 371 Date: Jul. 2, 1992
§ 102(e) Date: Jul. 2, 1992

[87] PCT Pub. No.: WO92/08569
PCT Pub. Date: May 29, 1992

[30] Foreign Application Priority Data
Nov. 14, 1990 [JP] Japan ................ 2-306088

[51] Int. Cl.⁵ .................................................. G01N 21/86
[52] U.S. Cl. .................................. 250/561; 219/121.78
[58] Field of Search .................. 250/561, 206.1, 206.2; 356/141, 152; 219/121.78, 121.79

[56] References Cited
U.S. PATENT DOCUMENTS
5,034,618 7/1991 Akeel et al. .................... 250/561

FOREIGN PATENT DOCUMENTS
57-154389 9/1982 Japan .
60-111789 6/1985 Japan .

*Primary Examiner*—David C. Nelms
*Attorney, Agent, or Firm*—Nikaido, Marmelstein, Murray & Oram

[57] ABSTRACT

When an adjustment of an optical path followed by a laser beam is performed by using an adjusting laser beam emitted by a laser oscillating source to obtain a condition such that the laser beam introduced in a robot unit of a laser robot is correctly directed to a light condensing device (36) provided at an extremety of the robot unit after changing the direction thereof due to a reflection by light reflecting mirrors arranged at respective joints in the robot unit, a position of the optical path of the adjusting laser beam projected by the light condensing device (36) in the interior of the robot unit (30) is detected by an optical sensor (46), and a different position of the optical path of the adjusting laser beam is simultaneously detected by a separate optical sensor (45) arranged at a position on the optical path for the laser beam located upstream with respect to the light condensing device (36), and an adjustment is carried out so that the center of movement of each of the joints of the robot unit (30) is in alignment with the optical path to be followed by the laser beam when detected at the two detecting positions.

10 Claims, 6 Drawing Sheets

METHOD OF ADJUSTING AN OPTICAL PATH FOLLOWED BY A LASER BEAM IN A LASER ROBOT AND AN APPARATUS FOR CARRYING OUT THE SAME

TECHNICAL FIELD

The present invention relates to a method of adjusting an optical path followed by a working laser beam in a laser robot, which adjusts the optical path by using an adjusting laser beam so that a spot of the working laser beam can be focused onto an irradiation point at a high energy density by a focusing device provided on an extremity of the laser robot, and a device for carrying out the method.

BACKGROUND ART

A laser robot such as a polar coordinates laser robot is disclosed in International Application No. PCT/JP90/01627. The disclosed laser robot receives a laser beam emitted by a laser oscillator, i.e., a laser light source provided outside the robot unit and transmitted to the robot unit. The laser beam is further transmitted by laser beam reflecting mirror units disposed respectively at the joints of the robot unit to travel along an optical path aligned with the axes of rotation of the joints to an extremity of the robot unit, and irradiates an irradiation object while being focused by a focusing device provided on the extremity of the robot unit and including a parabolic focusing reflector and an irradiating nozzle.

The position and angle of incidence of the laser beam on the laser beam reflecting mirror unit disposed at each joint must be accurately adjusted so that the laser beam is accurately transmitted to the focusing device provided on the extremity of the robot unit. When the laser beam is transmitted from a laser beam receiving position on the robot unit along an ideal optical path to the focusing device, the laser beam can be focused on a spot having a maximum energy density at an objective point on an object of irradiation, to enable the most effective cutting, welding or photochemical reaction.

Accordingly, the position and orientation of the laser beam reflecting mirror units disposed respectively in the joints of the robot unit of a laser robot are adjusted to adjust the optical path followed by the laser beam.

Figure 8:
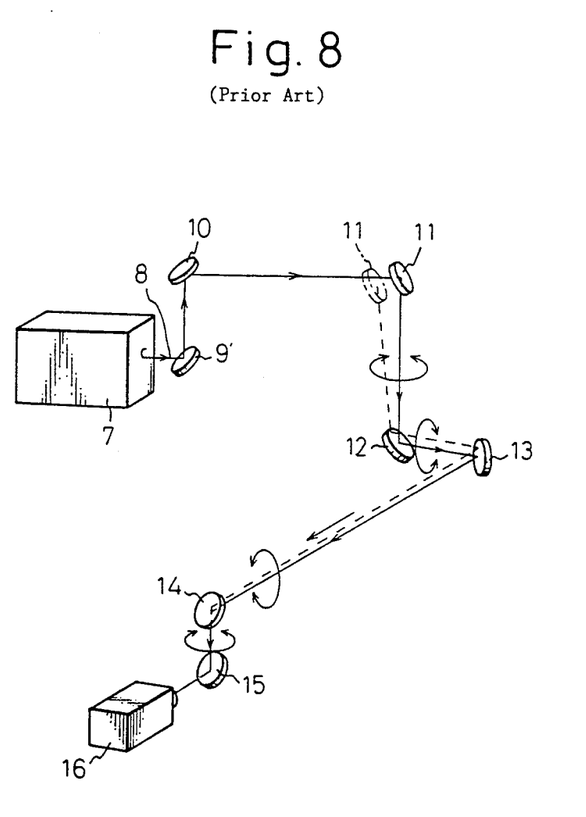
FIG. 8 is a diagrammatic view of assistance when explaining a prior art method of adjusting an optical path to be followed by a laser beam in a laser robot.

Referring to FIG. 8, when adjusting the optical path of a laser beam in a prior art laser robot by a prior art optical path adjusting method, an adjusting laser beam 8 emitted by a laser oscillator 7 is introduced through laser beam reflecting mirror units 9, 10 and 11 provided in a laser beam conduit line extended outside the robot unit of the laser robot into the robot unit. The adjusting laser beam is then reflected by laser beam reflecting mirror units 12, 13 and 14 provided respectively in the joints of a rotary robot body and robot arms, to thereby fall on a parabolic reflecting mirror 15 accommodated in a focusing device arranged on a robot wrist. The optical path followed by the adjusting laser beam reflected by the parabolic reflecting mirror 15 is detected by an optical sensor 16 disposed after the parabolic reflecting mirror 15 with respect to the direction of travel of the adjusting laser beam. For example, if the laser beam reflecting mirror unit 11 is shifted from a correct position indicated by continuous lines to a position indicated by dotted lines, the adjusting laser beam travels along an optical path, indicated by broken lines, not aligned with a correct optical path and falls on the parabolic reflecting mirror 15. Accordingly, if the adjusting laser beam moves in the optical sensor 16 when any one of the joints of the robot unit is turned, it is judged that the optical path followed by the adjusting laser beam is not aligned with the correct optical path and the position and orientation of the laser beam reflecting mirror units 12, 13, 14 and 15 provided in the joints are adjusted to adjust the position and angle of incidence of the adjusting laser beam on the laser beam reflecting mirror units 12, 13, 14 and 15 so that the adjusting laser beam does not move in the optical sensor 16 even if any one of the joints is turned.

Figure 9:
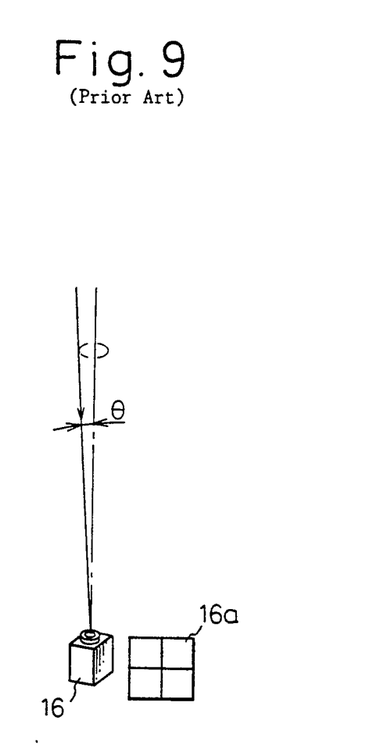
FIG. 9 is a diagrammatic view of assistance when explaining the matrix coordinate plane of an optical sensor employed when carrying out the method explained with reference to FIG. 8.

The optical sensor 16 comprises a known semiconductor position detecting device, such as a position sensitive detector, and the adjusting laser beam is a beam of visible laser light, such as laser light emitted by a Helium-Neon laser. Therefore, the adjusting laser beam is focused in a visible luminous spot P on the matrix coordinate plane 16a of the optical detector 16 as shown in FIG. 9. Accordingly, it is possible to decide whether or not the optical path followed by the adjusting laser beam is in alignment with the axis of rotation of the joint from the observation of the luminous spot P of the adjusting laser beam on the matrix coordinate plane 16a; that is, if the optical path followed by the adjusting laser beam is in alignment with the axes of rotation of all the joints of the robot unit, the position of the luminous spot P remains unchanged even if any one of the joints is turned. Thus, if the position of the luminous spot P on the matrix coordinate plane 16a remains unchanged when any one of the joints is turned, it is determined that a correct adjustment of the optical path followed by the laser beam has been achieved, and thus the optical path followed by the laser beam in alignment with the axes of rotation of all the joints and the laser beam can be properly projected onto the object to be irradiated.

On the other hand, when the optical path followed by the adjusting laser beam is not correctly adjusted and the luminous spot P moves along a circular path on the matrix coordinate plane 16a, the laser beam reflecting mirror units are adjusted, to thereby adjust the optical path.

Nevertheless, when measuring and adjusting the optical path followed by the laser beam according to the prior art optical path adjusting method, that the luminous spot P of the adjusting laser beam on the matrix coordinate plane 16a of the optical sensor 16 may remain fixed at one point on the matrix coordinate plane 16a as shown in FIG. 9, and the measurement shows the optical path followed by the laser beam in alignment with the axis of rotation of the joint when only the same joint is turned, because the prior art optical path adjusting method is a single-point laser beam detecting system that detects the adjusting laser beam by the optical sensor 16 disposed at a point on which the adjusting laser beam is focused by the parabolic reflector 15.

For example, the laser beam reflected by the parabolic reflecting mirror 15 of the focusing device may fall on the optical sensor 16 along an optical path inclined at an angle $\theta$ to a true optical path, as shown in FIG. 9. Accordingly, if the laser robot is an articulated laser robot and the laser beam reflected by the parabolic reflecting mirror 15 falls on the optical sensor 16 along the optical path inclined at the angle $\theta$ to the true optical path, the luminous spot P on the matrix coordinate plane 16a may show the measured optical path following the laser beam to be correct.

Thus, the prior art method of adjusting an optical path followed by a laser beam is unable to accurately adjust the optical path followed by the laser beam when the optical path adjusting method is applied to an articulated laser robot.

DISCLOSURE OF THE INVENTION

Accordingly, a principal object of the present invention is to eliminate the disadvantages of the prior art method of adjusting an optical path followed by a laser beam in a laser robot.

Another object of the present invention is to provide an optical path adjusting method applicable to the adjustment of an optical path followed by a laser beam in an articulated laser robot, and an apparatus for carrying out the optical path adjusting method.

The present invention provides a method of adjusting an optical path to be followed by a working laser beam in a laser robot by using an adjusting laser beam emitted by a laser oscillator in the direction of travel of the working laser beam, transmitted via laser beam reflecting mirror units disposed in a plurality of joints of a robot unit of a laser robot and reflected by a focusing device provided on an extremity of the robot unit, comprising:

placing a half mirror at a position at which one of the laser beam reflecting mirror units suitable for being arranged at the plurality of joints should be arranged;
detecting a luminous spot of the adjusting laser beam passed through said half mirror by a first photosensitive sensor;
detecting the luminous spot of the adjusting laser beam reflected by said half mirror by a second photosensitive sensor disposed behind the focusing device with respect to the direction of travel of the adjusting laser beam; and
adjusting the laser beam reflecting mirror units disposed in the joints of the robot unit so that the luminous spot of the adjusting laser beam passed through the half mirror remains fixed at a point on a light detecting coordinate plane of the first photosensitive sensor and the luminous spot of the adjusting laser beam reflected by the half mirror remains fixed at a point on a light detecting coordinate plane of the second photosensitive sensor when the optical axis of the half mirror to be followed by the adjusting laser beam is turned by turning the joints of the robot unit.

The present invention also provides an optical path adjusting apparatus for adjusting an optical path to be followed by a working laser beam in a robot unit of a laser robot having a plurality of joints, laser beam reflecting mirror means provided in the plurality of joints to reflect the working laser beam and a laser beam projecting means provided on an extremity of the robot body, by using an adjusting laser beam emitted by the laser oscillator in the direction of travel of the working laser beam, the optical path adjusting apparatus comprising:

a half mirror means detachably arranged as a laser beam reflecting mirror means at one of the plurality of joints of the laser robot;
a first optical sensor means for detecting an optical path of the adjusting laser beam through a detection of a luminous spot thereof formed on a coordinate plane after passing through the half mirror means; and
a second optical sensor means for detecting a luminous spot of the adjusting laser beam reflected by the half mirror means and formed on a coordinate plane, said second optical sensor means being disposed behind a focusing device of the laser beam projecting means with respect to the direction of travel of the adjusting laser beam;
whereby the laser beam reflecting mirror means are adjusted on the basis of the respective loci of the luminous spots of the adjusting laser beam detected by the first and second optical sensors, to thereby adjust the optical path to be followed by the working laser beam.

BRIEF DESCRIPTION OF THE DRAWINGS

The above and other objects, features and advantages of the present invention will be made apparent hereinafter in conjunction with the accompanying drawings, wherein.

BEST MODE OF CARRYING OUT THE INVENTION

Figure 3:
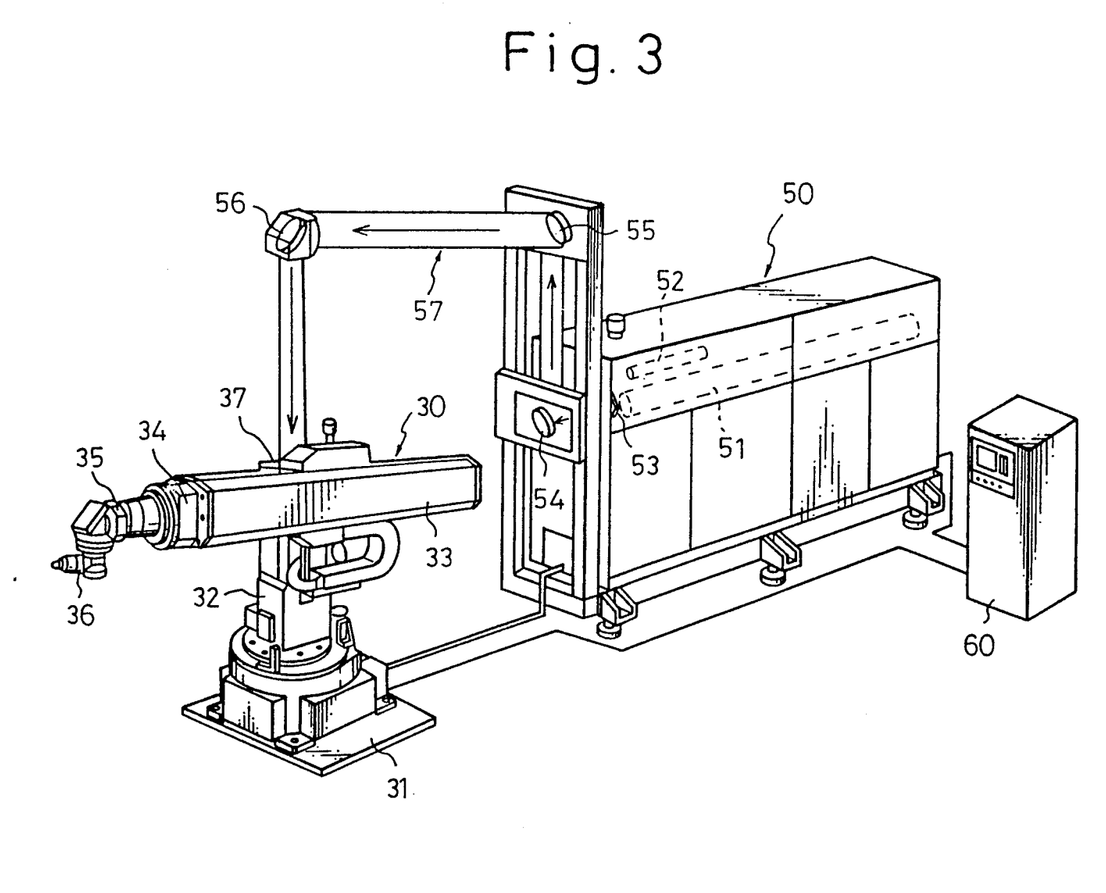
FIG. 3 is a general perspective view of an articulated laser robot.
Figure 4:
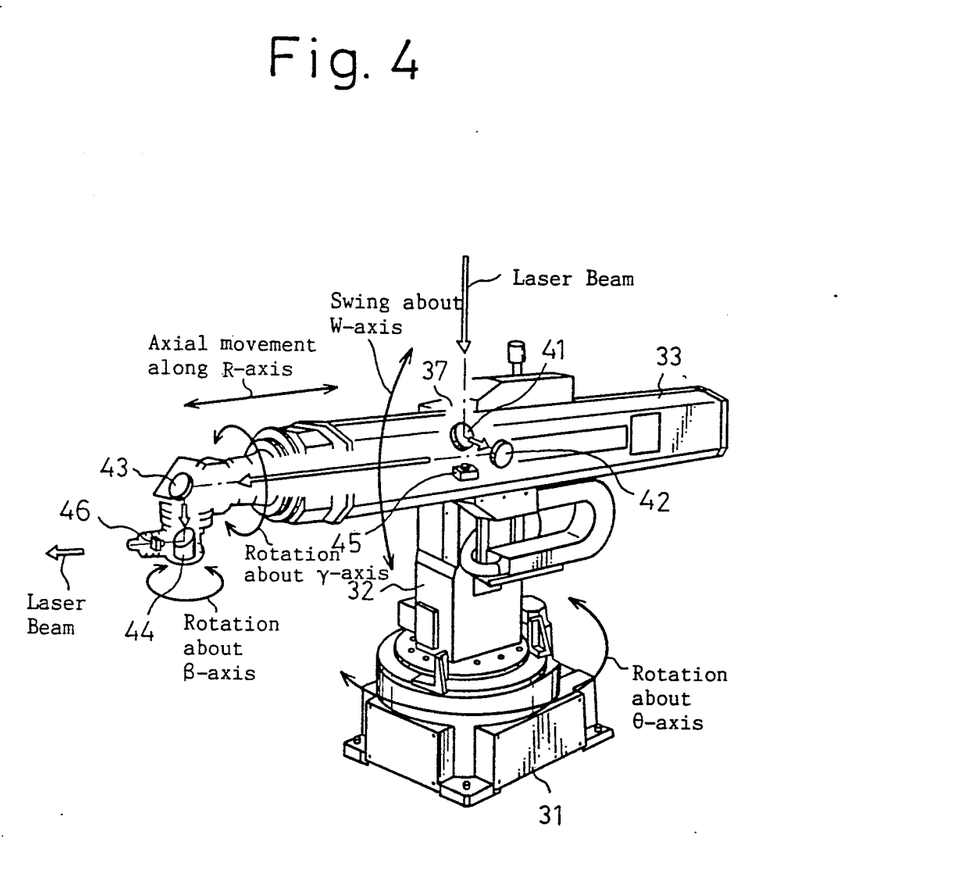
FIG. 4 is an enlarged perspective view of the laser robot shown in FIG. 3, showing details of the arrangement of an optical path adjusting device in a first embodiment according to the present invention.

FIG. 3 shows a laser robot system provided with a multi-articulated type laser robot to which an optical path adjusting method in accordance with the present invention is applicable, and a laser unit for sending a laser beam to the laser robot through a laser beam conduit line to the laser robot, and FIG. 4 shows an optical path adjusting device embodying the present invention as applied to a multi-articulated type robot.

Referring to FIGS. 3 and 4, the robot unit 30 of the multi-articulated type robot is provided with a robot base 31 fixedly installed on a base surface, a robot body 32 set in an upright position for rotation about a vertical axis ($\theta$-axis), a robot upper arm 32 joined by a joint to the side surface of the upper portion of the robot body 32 for W-axis swing motion in a vertical plane about an axis W, a robot forearm 34 capable of R-axis axial movement in directions along its axis R perpendicular to the axis W, and a robot wrist 35 joined by a joint to the front end of the robot forearm 34 and capable of rotating about a γ-axis in alignment with the axis R and about a β-axis perpendicular to the β-axis; and a light condensing or a focusing device 36 for condensing a laser beam, including a parabolic reflecting mirror 44 and a nozzle portion 36a, and held on a front end of the robot wrist 35.

As shown in detail in FIG. 3, a laser oscillating unit 50 and a robot controller 60 are disposed outside the robot unit 30 of the articulated laser robot. The laser oscillating unit 50 is provided internally with a main laser tube 51 which emits an invisible carbon dioxide gas laser beam as a working laser beam, and an auxiliary laser tube 52 which emits a He-Ne laser beam as an adjusting laser beam. A laser beam selector shutter 53 is operated to selectively send out the laser beam emitted by either the main laser tube 51 or the auxiliary laser tube 52. The laser beam selector shutter 53 has a generally known construction, and thus a description thereof will be omitted. A laser beam, i.e., either the working laser beam emitted by the main laser oscillating tube 51 or the adjusting laser beam emitted by the auxiliary laser oscillating tube 52, is transmitted through a laser beam conduit line 56 provided with laser beam reflecting mirror units 54, 55 and 56 disposed respectively at bends in the laser beam conduit line 57 into the robot unit 30 through a laser beam inlet opening 37 formed on top of the robot body 32. Naturally, the laser oscillating unit 50 is provided with a cooling water supply system for supplying cooling water to laser beam reflecting mirror units and the associated parts provided within the robot unit 30.

The robot controller 60 controls the operation of the joints of the robot unit 30 and the laser beam emitting operation of the laser oscillating unit 50.

The laser beam inlet opening 37 is coaxial with the axis θ. The laser beam, i.e., either the working laser beam or the adjusting laser beam, transmitted through the laser beam inlet opening 37 into the robot unit 30 of the laser robot is reflected by a first laser beam reflecting mirror unit 41 disposed in the joint joining the robot upper arm 33 to the robot body 32 into the robot upper arm 33 toward a second laser beam reflecting mirror unit 42 disposed opposite to the first laser beam reflecting mirror unit 41 within the robot upper arm 33. The second laser beam reflecting mirror unit 42 reflects the laser beam so that the laser beam travels through the robot upper arm 33 along the axis R toward the robot forearm 34.

The laser beam reaches the interior of the robot wrist 35 mounted on the front end of the robot forearm 34 and falls on a third laser beam reflecting mirror unit 43 disposed in the joint at a position on the third laser beam reflecting mirror unit 43 coinciding with the intersection of the axis R of the robot forearm 34 and the axis γ of the robot wrist 35. Then, the laser beam reflected by the third laser beam reflecting mirror unit 43 falls on a fourth laser beam reflecting mirror unit 44 i.e., a parabolic reflector 44 included in the focusing device 36. The parabolic reflector 44 reflects and focuses the laser beam on an object of irradiation in a spot having a high energy density.

As is obvious from the foregoing description, the position and angle of incidence of the laser beam on each of the laser beam reflecting mirror units 41 to 44 must be adjusted beforehand by an optical path adjusting method like the prior art optical path adjusting method explained with reference to FIG. 8, so that the laser beam travels along an optical path in alignment with the axes of rotation of the joints to enable the laser beam introduced into the robot unit 30 to travel via the laser beam reflecting mirror units 41 to 44 and to be projected through the nozzle 36a of the focusing device 36 on a desired object of irradiation. Nevertheless, the prior art optical path adjusting method explained with reference to FIG. 8 is unable, in some cases, to adjust the optical path so that the laser beam travels through the robot unit 30 along an optical path accurately in alignment with the axes of rotation of the joints. Accordingly, as mentioned above, the present invention is intended to solve such problems in the prior art optical path adjusting method.

The present invention uses the adjusting laser beam emitted by the auxiliary laser tube 52 of the laser unit 50 and transmitted through the laser beam inlet opening 37 into the robot unit 30, and two optical sensors disposed respectively at two points on the optical path formed within the robot unit 30 so that the optical path is in accurate alignment with the axes of rotation of the joints.

The two optical sensors are disposed respectively at two points on the optical path formed within the robot unit 30 in the two joints. The optical path adjusting device in this embodiment employs a first optical sensor 45 disposed below the first laser beam reflecting mirror unit 41 within the robot body 32, and a second laser beam reflecting mirror 46 disposed after the fourth laser beam reflecting mirror unit 44, i.e., the parabolic reflector 44 with respect to the direction of travel of the laser beam.

The optical sensors 45 and 46, like the optical sensor 16 employed in the prior, comprise position sensitive detectors (PSDs), i.e., semiconductor position detecting devices. When a light beam is projected on the matrix coordinate plane of the PSD, the PSD detects the position of incidence of the light beam and provides an electric signal representing the position.

In adjusting the optical path, the first laser beam reflecting mirror unit 41, i.e., a total reflection mirror unit, is replaced temporarily with a half mirror. The first optical sensor 45 detects the adjusting laser beam passed through the half mirror. The second optical sensor 46 detects the adjusting laser beam reflected by the half mirror, the second laser beam reflecting mirror unit 42 and the third laser beam reflecting mirror unit 43, and reflected and focused by the parabolic reflector 44 of the focusing device 36.

The robot unit 30 is provided with access doors, not shown, to enable the first optical sensor 45 and the second optical sensor 46 to be detachably located within the robot unit 30 from outside. After the completion of optical path adjustment, the optical sensors 45 and 46 can be taken outside the robot unit 30.

The optical path adjusting device and the optical path adjusting method employing the optical sensors 45 and 46 thus disposed for adjusting the optical path so that the laser beam introduced into the robot unit 30 travels along the optical path in alignment with the axis θ will be described hereinafter with reference to FIGS. 1 and 2.

Figure 1:
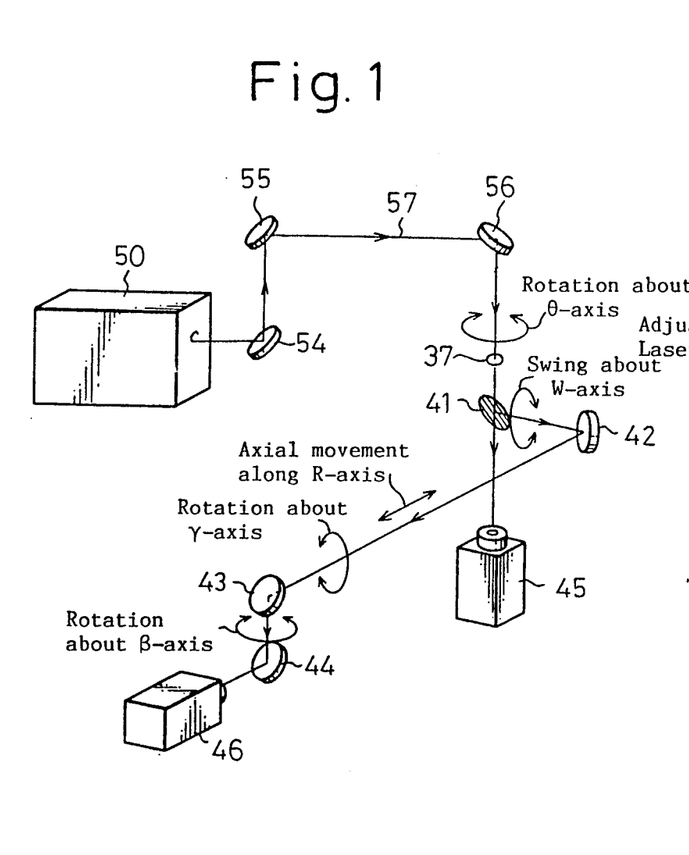
FIG. 1 is a diagrammatic view of assistance when explaining a principle on which a method of adjusting an optical path to be followed by a laser beam in a laser robot is based.
Figure 2:
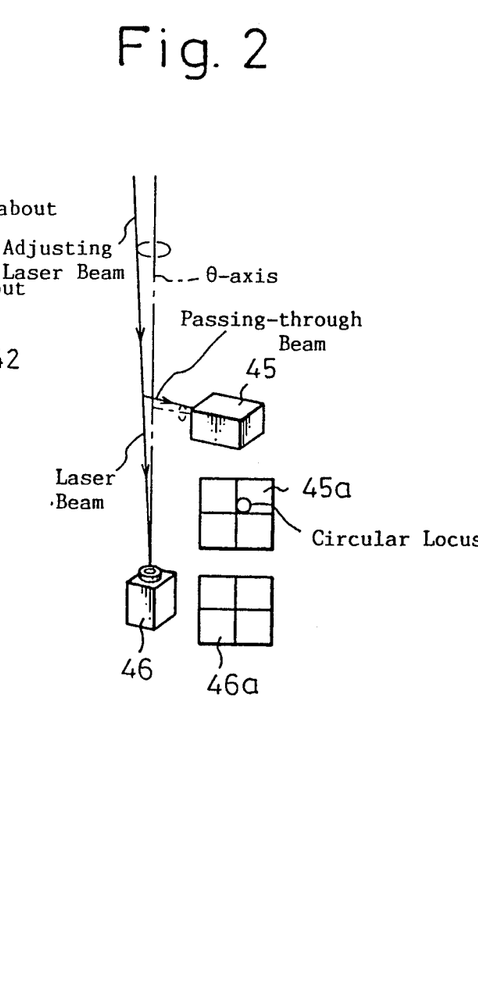
FIG. 2 is a diagrammatic view showing luminous spots of an adjusting laser beam on the matrix coordinate planes of two optical sensors.

Typically shown in FIG. 1 are the laser beam reflecting mirror units 54 to 56 and 41 to 44, a first optical sensor 45 and a second optical sensor 46 disposed on the optical path extending from the laser unit 50 provided with the auxiliary tube 52 which emits the adjusting laser beam and the parabolic reflector 44 of the focusing device 36 of the laser robot.

The adjusting laser beam sent out from the laser unit 50 and introduced into the robot unit 30 of the laser robot 30 falls on the half mirror put in the place of the first laser beam reflecting mirror unit 41. The adjusting laser beam passed through the half mirror is detected by the first optical sensor 45. The adjusting laser beam reflected by the half mirror travels via the laser beam reflecting mirror units 42 and 43 and falls on the parabolic reflector 44. The second sensor 46 disposed after the parabolic reflector 44 with respect to the direction of travel of the adjusting laser beam detects the adjusting laser beam reflected by the parabolic reflector 44. The adjusting laser beam forms luminous spots on the matrix coordinate planes 45a and 46a of the optical sensors 45 and 46, respectively, as shown in FIG. 2. The optical sensors 45 and 46 detect the respective positions of the luminous spots, respectively. If the adjusting laser beam reflected by the parabolic reflector 44 of the focusing device 36 falls on the matrix coordinate plane 46a of the second optical sensor 46 along a path inclined at an angle to a perpendicular to the matrix coordinate plane 46a, the luminous spot of the adjusting laser beam on the matrix coordinate plane 45a of the first optical sensor 45 moves along a circular locus even if the luminous spot on the matrix coordinate plane 46a of the second optical sensor 46 remains stationary, and thus, a misalignment of the optical path with the axis of rotation of the joint on the laser beam reflecting mirror unit can be detected. The misalignment of the optical path with the axis of rotation of the joint can be quantitatively and visually recognized in adjusting the optical path.

After the detection of the luminous spots of the adjusting laser beam, the joint is turned about the objective axis θ to turn the robot body 32 about the axis θ. Consequently, the luminous spot formed on the matrix coordinate plane 45a of the first optical sensor 45 moves along a circular locus on the matrix coordinate plane 45a as best shown in FIG. 2 if the optical path is misaligned with the axis θ of rotation of the robot body 32. If the optical path is misaligned with the axis θ, the laser beam reflecting mirror units of the laser beam duct line 57, for example, the laser beam reflecting mirror units 55 and 56, are adjusted so that the adjusting laser beam is introduced through the laser beam inlet opening 37 into the robot unit along an optical path in alignment with the axis θ. When the optical path is thus aligned with the axis θ, the luminous spot on the matrix coordinate plane 45a of the first optical sensor 45 remains stationary at the center of the circular locus even if the robot body 32 is rotated. After the completion of alignment of the optical path, along which the adjusting laser beam is introduced into the robot unit, with the axis θ, the half mirror is replaced with the laser beam reflecting mirror unit 41, the laser beam reflecting mirror unit 42, i.e., a total reflection mirror unit, is replaced with the half mirror, the first optical sensor 45 is set at a position appropriate for detecting the adjusting laser beam passed through the half mirror, and then the laser beam reflecting mirror unit 41 is adjusted to align the optical path with the axis W.

Since the circular locus of the luminous spot on the matrix coordinate plane 45a of the first optical sensor 45 can be visually monitored during the adjustment of the optical path, the result of every correcting operation can be confirmed through the visual recognition of the position of the luminous spot on the matrix coordinate plane 45a of the first optical sensor 45.

Although the optical path adjusting method in this embodiment has been described as applied to the laser robot having the robot unit 30 provided with the linear-motion robot forearm 34, naturally, an optical path adjusting method of the present invention is also applicable to a laser robot provided with a robot forearm joined for swing motion to a robot upper arm by a joint.

The construction, which is publicly known, of the laser beam reflecting mirror units 41 to 43 disposed respectively in the joints will be described briefly with reference to FIG. 5.

Figure 5:
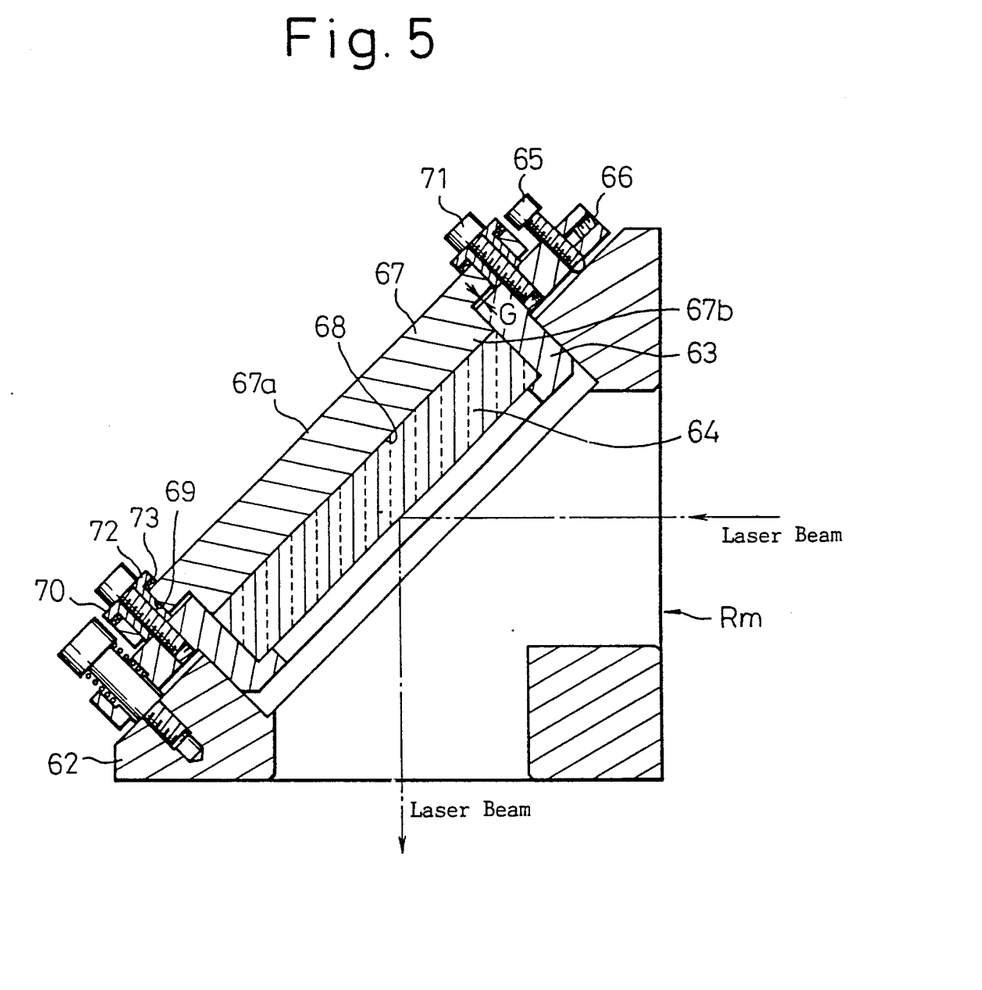
FIG. 5 is a sectional view of a laser beam reflecting mirror unit disposed in each joint of the laser robot.

Referring to FIG. 5, a laser beam reflecting mirror unit Rm comprises a mirror base 62 attached to the joint of the robot unit 30, a mirror housing 63 held on the mirror base 62 by springs 7 compressed with screws 6, a laser beam reflecting mirror 64, adjusting screws 65 for adjusting the position of the mirror housing 63 relative to the mirror base 62, fastening screws 66 for fastening the mirror housing 63 to the mirror base 62 after the positional adjustment of the mirror housing 63, and a mirror holder 67 for holding the laser beam reflecting mirror 64 in the mirror housing 63. The mirror holder 67 has the shape of a stepped disk having a flange 67a and a reduced portion 67b having a diameter smaller than that of the flange 67a. The reduced portion 67b of the mirror holder 67 is fitted in the mirror housing 63 with the end surface of the reduced portion 67b pressed against the back surface of the laser beam reflecting mirror 64 to hold the laser mirror 64 between the mirror housing 63 and the mirror holder 67. The flange 67a is provided with a plurality of through holes 69 at appropriate angular intervals, flanged bushes 70 are fitted respectively in the through holes 69, and screws 71 are screwed through the flanged bushes 70 in the mirror housing 63 to fasten the mirror holder 67 to the mirror housing 63. A wave washer 73, i.e., an elastic member, is interposed between the flange 72 of each flanged bush 70 and the outer surface of the mirror holder 67.

The inner end of each flanged bush 70 projecting from the inner end of the through hole 69 of the mirror holder 67 is in contact with the end surface of the mirror housing 63 to form an appropriate gap G between the inner end of the flange 67a of the mirror holder 67 and the end surface of the mirror housing 63. Accordingly, the gap G remains between the inner end of the flange 67a of the mirror holder 67 and the end surface of the mirror housing 63 when the inner end 68 of the reduced portion 67b of the mirror holder 67 is pressed against the back surface of the laser beam reflecting mirror 64 by fastening the fastening screws 71 in fastening the mirror holder 67 to the mirror housing 63.

Therefore, in a state where the mirror holder 67 is fastened to the mirror housing 63, the laser beam reflecting mirror 64 is pressed against the bottom wall of the mirror housing 63 by the mirror holder 67 which is in turn pressed by the resilience of the wave washers 73 against the laser beam reflecting mirror 64. The effective resilience of the wave washers 73 is defined by the gap G and the fastening force of the fastening screws 71 is effective regardless of the resilience of the wave washers 73. Consequently, the laser beam reflecting mirror 64 is held on the bored bottom wall of the mirror housing 63 by a fixed pressure.

Since the mirror holder 67 always applies the fixed pressure to the laser beam reflecting mirror 64 in holding the laser beam reflecting mirror 64 in the mirror housing 63, the position of the laser beam reflecting mirror 64 relative to the mirror housing 63 can be reproduced with a satisfactory reproducibility when the laser reflecting mirror 64 is removed for maintenance from the mirror housing 63 and the same is mounted again on the mirror housing 63. Thus, it is possible to position the laser beam reflecting mirror 64 in the mirror housing 63 in a high accuracy without requiring angular adjustment so as to achieve a desired laser beam reflecting action, when the laser beam reflecting mirror 64 placed in the mirror housing 63 after removing the same from the laser base 50 to polish the reflecting surface 4a thereof for periodic maintenance and when the laser beam reflecting mirror 64 is replaced with the half mirror for carrying out the optical path adjusting method of the present invention and the laser beam reflecting mirror 64 is returned to the mirror housing 63 after the adjustment of the optical path.

Figure 6:
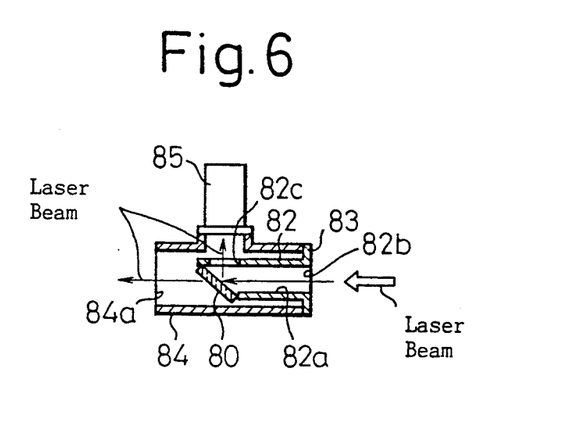
FIG. 6 is a sectional view of an optical path adjusting device in a second embodiment according to the present invention.
Figure 7:
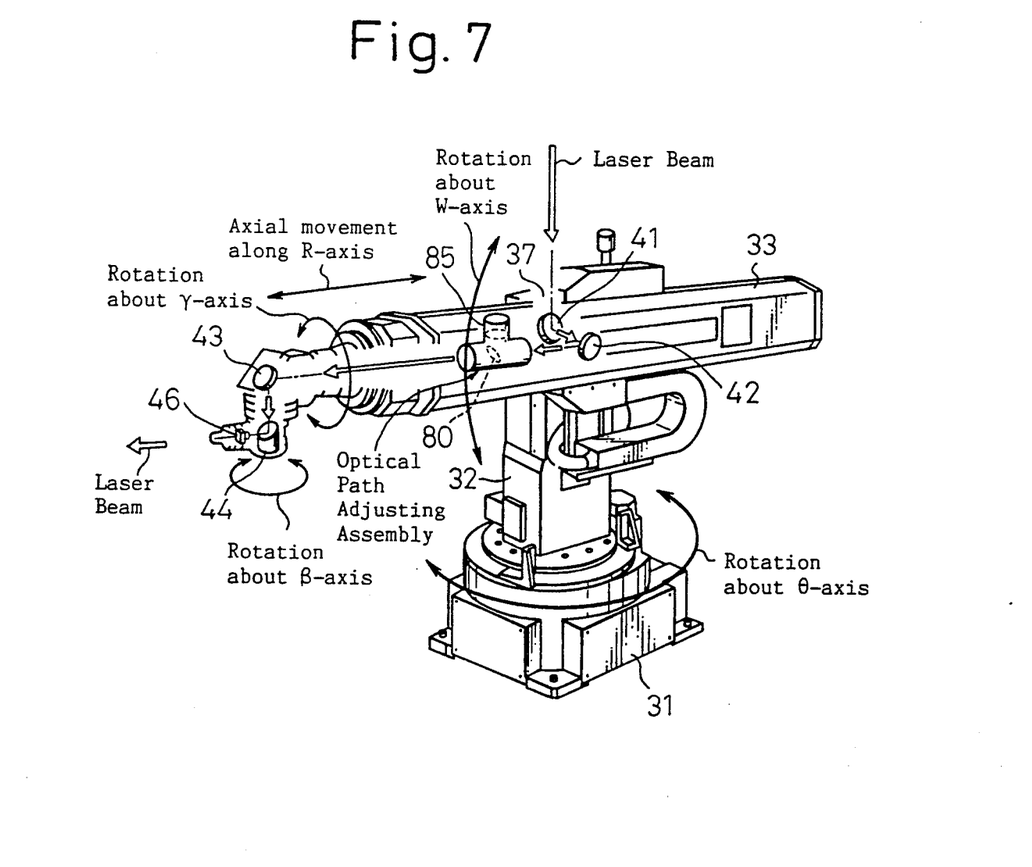
FIG. 7 is a perspective view of an articulated laser robot incorporating the optical path adjusting device of FIG. 6.

An optical path adjusting method according to a different embodiment of the present invention shown in FIGS. 6 and 7 employs an optical path adjusting assembly provided with, in combination, a half mirror and an optical sensor corresponding to the first optical sensor 45.

Referring to FIG. 6, the optical path adjusting assembly includes a half mirror 80, a cylindrical mirror holder 82, a hollow housing 84 and an optical sensor 85, and can be detachably incorporated into the robot unit 30 of the laser robot. The half mirror 80 is held within the mirror holder 82 at an angle to the line of an optical path of the mirror holder 82. The mirror holder 82 is fixed to the housing 84. The mirror holder 82 has a laser beam inlet opening 82b for receiving a laser beam therethrough and an opening 82c through which the laser beam reflected by the half mirror 80 advances. An optical sensor 85, which corresponds to the afore-mentioned first optical sensor 45, is connected to housing 84 to receive the laser beam reflected by the half mirror 80 and passed through the opening 82c. The housing 84 has a laser beam outlet opening 84a through which the laser beam passed through the half mirror 80 advances. The mirror holder 82 is provided on its inlet end with a flange 83 to be detachably attached to a fixed part of the robot unit 30 when mounting the assembly of the mirror holder 82 and the housing 84 within the robot unit 30.

When the optical path adjusting assembly is disposed in the optical path within the robot unit 30 of the laser robot as shown in FIG. 7 for adjusting the optical path, the laser beam reflecting mirror of each of the laser beam reflecting mirror units 41 to 44 disposed respectively in the joints of the robot unit 30 need not be replaced with a half mirror in adjusting the optical path, which eliminates troublesome work for replacing the laser beam reflecting mirror of each of the laser beam reflecting mirror units 41 to 44 in adjusting the optical path.

The optical path adjusting method in the second embodiment employing the optical path adjusting assembly shown in FIG. 6, like the optical path adjusting method in the first embodiment, moves each joint of the robot unit 30 and adjusts the corresponding laser beam reflecting mirror unit among the laser beam reflecting mirror units 41 to 44 so that both the luminous spot on the matrix coordinate plane of the optical sensor 85 and the luminous spot on the matrix coordinate plane of an optical sensor 46 disposed behind the focusing device 44 with respect to the direction of travel of the adjusting laser beam become stationary.

As apparent from the foregoing description, according to the present invention, the position of the optical path of the adjusting laser beam within the robot unit of the laser robot is detected and measured at a position before the focusing device with respect to the direction of a travel of the laser beam and at a position behind the focusing device with respect to the direction of travel of the laser beam and the joint is operated to see if the optical path of the adjusting laser beam is in alignment with the axis of rotation of the corresponding joint of the robot unit, the misalignment of the optical path of the adjusting laser beam can be recognized through the visual observation of the circular locus of the luminous spot on the matrix coordinate plane of one of the two optical sensors, and the optical path of the adjusting laser beam can be brought into accurate alignment with the axis of rotation of the joint by adjusting the laser beam reflecting mirror provided in the joint so that the luminous spot remains stationary at the center of the circular locus even if the joint is turned. Consequently, when irradiating an object of irridation with a working laser beam by the laser robot, the working laser beam traveling through the robot unit is accurately reflected in desired directions by the laser beam reflecting mirrors disposed respectively in the joints, and reaches the focusing device, and then the focusing device is able to project the working laser beam in a spot having a high energy density on the object of irradiation to efficiently achieve a desired laser processing, such as laser cutting, laser welding or photochemical reaction.

We claim:
1. A method of adjusting an optical path to be followed by a working laser beam within a robot body of a laser robot by using an adjusting laser beam emitted by a laser oscillating unit along an optical path to be followed by the working laser beam so as to be introduced into the robot body through a laser beam inlet opening formed in the robot body, to be reflected by the laser reflecting mirrors of a plurality of laser beam reflecting mirror units disposed respectively at a plurality of joints of the robot unit and to be projected by a focusing device provided on an extremity of the robot unit, said method comprising steps of:
(a) replacing the laser beam reflecting mirror of one of the laser beam reflecting mirror units respectively disposed in said plurality of joints with a half mirror;
(b) detecting a line of an optical path followed by said adjusting laser beam having passed through said half mirror as a luminous spot by a first photosensitive sensor;
(c) detecting a line of an optical path followed by the adjusting laser beam having been reflected by said half mirror as a luminous spot by a second photosensitive sensor arranged behind said focusing device with respect to the direction of travel of said adjusting laser beam; and
(d) adjusting the laser beam reflecting mirror units arranged at said respective joints of said robot unit in a manner such that both luminous spots respectively formed on detecting coordinate planes of said first and second photosensitive detectors remain stationary on said detecting coordinate planes when said joints of said robot unit are turned to turn an optical axis along which said adjusting laser beam is brought onto said half mirror as an incident laser beam.

2. A method of adjusting an optical path to be followed by a working laser beam within the robot unit of a laser robot according to claim 1, wherein the respective laser beam reflecting mirrors of the first laser beam reflecting mirror unit arranged nearest to the laser beam inlet opening to the n-th laser beam reflecting mirror unit are sequentially replaced in that order with a half mirror during the step of replacing the laser beam reflecting mirror of the laser beam reflecting unit with said half mirror, and wherein the steps (b) to (d) are executed every time said sequential replacements are implemented.

3. A method of adjusting an optical path to be followed by a working laser beam within a robot unit of a laser robot by using an adjusting laser beam emitted by a laser oscillating unit along an optical path to be followed by working laser beam to be introduced into the robot body through a laser beam inlet opening formed in said robot body, to be reflected by laser beam reflecting mirrors of a plurality of laser beam reflecting mirror units respectively arranged at joints of said robot unit and to be projected by a focusing device provided on an extremity of said robot unit, said method comprising steps of:

(a) disposing a single half mirror on an optical path to be followed by a laser beam within said robot unit;

(b) detecting a line of an optical path followed by the adjusting laser beam having been reflected by said half mirror as a luminous spot by a first photosensitive sensor;

(c) detecting a line of an optical path followed by the adjusting laser beam having passed through said half mirror as a luminous spot by a second photosensitive sensor disposed behind said focusing device with respect to the direction of travel of said adjusting laser beam; and (d) adjusting the laser beam reflecting mirror units respectively disposed at said joints of said robot unit in such a manner that both said luminous spots formed respectively on respective detecting coordinate planes of said first and second photosensitive sensors remain stationary when the joints of said robot unit are operated to turn the optical axis of said half mirror to be followed by said adjusting laser beam upon being brought onto said half mirror.

4. An optical path adjusting apparatus adapted for a laser robot for adjusting an optical path to be followed by a laser beam in the laser robot provided with a robot unit, a laser beam inlet opening formed in the robot unit, a plurality of joints accommodated in the robot unit, laser beam reflection mirror means respectively arranged at the plurality of joints to reflect a working laser beam emitted by a laser oscillating unit and a laser beam projecting means provided on an extremity of the robot unit, so as to be aligned with respective operating axes of said joints by using an adjusting laser beam emitted by said laser unit to travel along an optical path to be followed by said working laser beam, said optical path adjusting apparatus comprising:

a half mirror means to be detachably mounted on the laser beam reflecting mirror means arranged at one of said plurality of joints of said laser robot;

a first optical sensor means for detecting a position of an optical path of said adjusting laser beam having passed through said half mirror means on the basis of a luminous spot formed on a coordinate plane by said adjusting laser beam having passed through said half mirror; and a second optical sensor means for detecting a position of an optical path of said adjusting laser beam having been reflected by said half mirror on the basis of a luminous spot formed on a coordinate plane by said adjusting laser beam having bee reflected by said half mirror arranged after a focusing device accommodated in said laser beam projecting means with respect to the direction of travel of said adjusting laser beam;

whereby the optical path to be followed by a laser beam is adjusted by adjusting the laser beam reflecting mirror means on the basis of respective loci along which said luminous spots respectively formed on said coordinate planes of said first and second optical sensor means by said adjusting laser beam move when at least one of said plurality of joints is operated.

5. An optical path adjusting apparatus for a laser robot, according to claim 4, wherein said half mirror means is detachably mounted on a holder means of said laser beam reflecting mirror means.

6. An optical path adjusting device for a laser robot, according to claim 4, wherein said first and second optical sensor means are removably disposed within said robot unit of said laser robot.

7. An optical path adjusting device for a laser robot, according to claim 6, wherein each of said first and second sensor means is provided with a position sensitive detector.

8. An optical path adjusting device for a laser robot, for adjusting an optical path to be followed by a laser beam in the laser robot comprising a robot unit, a laser beam inlet opening formed in a robot unit, a plurality of joints accommodated in the robot unit, laser beam reflecting means respectively arranged at the joints to reflect a working laser beam emitted by a laser oscillating unit and a laser beam projecting means provided on an extremity of the robot unit, so as to be aligned with respective operating axes of said joints by using an adjusting laser beam emitted by the laser oscillating unit to travel along an optical path to be followed by the working laser beam, said optical path adjusting apparatus comprising:

a half mirror means arranged in an optical path to be followed by a laser beam within the robot unit of the laser robot;

a first optical sensor means having a coordinate plane, for detecting a position of an optical path followed by said adjusting laser beam reflected by said half mirror on the basis of a luminous spot formed on said coordinate plane by the adjusting laser beam reflected by said half mirror means; and a second optical sensor means having a coordinate plane, for detecting a position of an optical path followed by said adjusting laser beam having passed through said half mirror on the basis of a luminous spot formed on said coordinate plane by said adjusting laser beam having passed through said half mirror means and disposed after a focusing device accommodated in said laser beam projecting means with respect to the direction of travel of said adjusting laser beam;

whereby the optical path to be followed by a laser beam is adjusted by adjusting said laser beam reflecting mirror means on the basis of respective loci along which said luminous spots respectively formed on said coordinate planes of said first and second optical sensor means by said adjusting laser beam movement when at least one of said plurality of joints is operated.

9. An optical path adjusting device for a laser robot, according to claim 8, wherein said half mirror means is contained in a housing means, and said first optical sensor means is attached to said housing means.

10. An optical path adjusting device for a laser robot, according to claim 9, wherein said housing means is provided with a flange means capable of detachably attached to the robot unit of the laser robot within the robot unit.

* * * * *